United States Patent
Saeki et al.

(10) Patent No.: US 7,687,168 B2
(45) Date of Patent: Mar. 30, 2010

(54) FUEL CELL SYSTEM FOR SETTING PREDETERMINED OPERATION STATE WHEN SUBSTITUTIONAL VALUE CONTROL IS IMPOSSIBLE

(75) Inventors: Hibiki Saeki, Utsunomiya (JP); Satoshi Aoyagi, Shimotsuke (JP); Kuniaki Ojima, Yuki (JP)

(73) Assignee: Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 11/438,038

(22) Filed: May 19, 2006

(65) Prior Publication Data

US 2006/0286418 A1    Dec. 21, 2006

(30) Foreign Application Priority Data

Jun. 17, 2005    (JP) ............................. 2005-177592

(51) Int. Cl.
*H01M 8/04* (2006.01)
*H01M 8/00* (2006.01)

(52) U.S. Cl. ........................... 429/22; 429/13; 903/908; 903/944

(58) Field of Classification Search ................... 429/13, 429/22, 23, 25; 903/944
See application file for complete search history.

(56) References Cited

U.S. PATENT DOCUMENTS

| | | | | |
|---|---|---|---|---|
| 4,904,548 | A * | 2/1990 | Tajima | 429/22 |
| 6,000,000 | A * | 12/1999 | Hawkins et al. | 707/201 |
| 6,294,277 | B1 * | 9/2001 | Ueno et al. | 429/22 |
| 7,006,898 | B2 * | 2/2006 | Barbir et al. | 700/286 |

FOREIGN PATENT DOCUMENTS

| | | | |
|---|---|---|---|
| JP | 2004-95226 | | 3/2004 |
| JP | 2004-179127 | * | 6/2004 |
| JP | 2004-342475 | | 12/2004 |
| JP | 2005-160136 | | 6/2005 |

OTHER PUBLICATIONS

Machine translation of JP 2004-179127, Ueda et al., Jun. 24, 2004.*
Japanese Office Action for Application No. 2005-177592, dated Jun. 9, 2009.
Japanese Notice of Allowance for Application No. 2005-177592, dated Aug. 25, 2009.

* cited by examiner

*Primary Examiner*—Dah-Wei D Yuan
*Assistant Examiner*—Kwang Han
(74) *Attorney, Agent, or Firm*—Lahive & Cockfield, LLP; Anthony A. Laurentano, Esq.

(57) ABSTRACT

A fuel cell system installed in a fuel-cell movable body. The system includes a fuel cell for generating electric power using reaction gases; a plurality of sensors for measuring states of the fuel cell; an abnormal state detecting device for detecting an abnormal state of at least one of said plurality of sensors; a substitution possibility determining device for determining whether there are one or more substitution sensors from among said plurality of sensors, each substitution sensor outputting a signal value used for setting a substitutional value for a signal value output from the sensor whose abnormal state has been detected; and a predetermined operation control device for operating the fuel cell in a predetermined operation state when the abnormal state of the sensor is detected by the abnormal state detecting device and it is determined by the substitution possibility determining device that there is no substitution sensor.

5 Claims, 4 Drawing Sheets

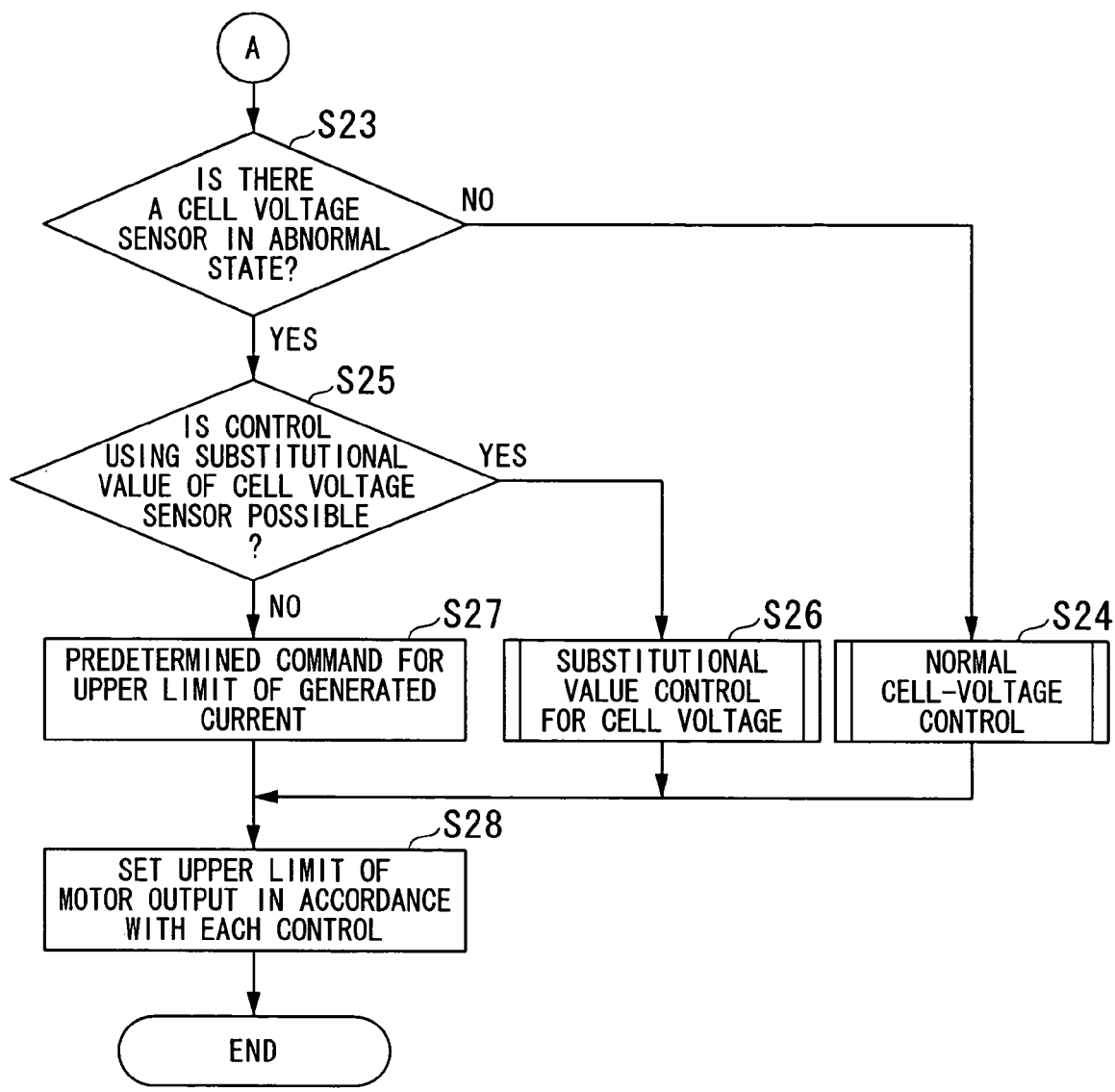

FUEL CELL SYSTEM FOR SETTING PREDETERMINED OPERATION STATE WHEN SUBSTITUTIONAL VALUE CONTROL IS IMPOSSIBLE

BACKGROUND OF THE INVENTION

1. Field of the Invention

The present invention relates to a fuel cell system.

Priority is claimed on Japanese Patent Application No. 2005-177592, filed Jun. 17, 2005, the content of which is incorporated herein by reference.

2. Description of the Related Art

In a known fuel cell system having a plurality of sensors for detecting operation states of a fuel cell, when a specific sensor (e.g., an air flow rate sensor, a hydrogen inlet pressure sensor, or a cooling water inlet pressure sensor) has an abnormal state, a substitutional value with respect to a signal value output from the sensor in the abnormal state is computed based on a signal value output from another sensor (e.g., an air temperature sensor, a hydrogen outlet pressure sensor, or a cooling water outlet pressure sensor) in a normal state, and the operation of the fuel cell is continued in accordance with the computed substitutional value (see, for example, Japanese Unexamined Patent Application, First Publication No. 2004-179127).

In the fuel cell system relating to the above conventional technique, the fuel cell is operated in accordance with signal values output from the plurality of sensors, and only a substitutional value for the signal value output from a sensor in the abnormal state is computed based on a signal value output from another sensor in the normal state. Therefore, if the sensor necessary for computing the substitutional value enters an abnormal state, it is difficult to continue the operation of the fuel cell. For example, when the fuel cell system is provided for supplying electric power to a driving source of a vehicle, it may be difficult to run the vehicle.

In addition, if redundant or excessive sensors are provided for computing a substitutional value for a target sensor, the structure of the fuel cell system is complicated, thereby increasing the cost necessary for implementing the structure.

SUMMARY OF THE INVENTION

In light of the above circumstances, an object of the present invention is to provide a fuel cell system by which, even when a sensor for detecting an operation state of the fuel cell enters an abnormal state, desired operation of the fuel cell can be secured.

Therefore, the present invention provides a fuel cell system which is installed in a fuel-cell movable body (e.g., a fuel cell vehicle in an embodiment explained later), the system comprising:

a fuel cell (e.g., a fuel cell 11 in the embodiment) for generating electric power using reaction gases (e.g., hydrogen and air in the embodiment);

a plurality of sensors (e.g., sensors 31 to 46 in the embodiment) for measuring states of the fuel cell;

an abnormal state detecting device (e.g., an ECU 22 in the embodiment) for detecting an abnormal state of at least one of said plurality of sensors;

a substitution possibility determining device (e.g., an ECU 22 in the embodiment) for determining whether there are one or more substitution sensors from among said plurality of sensors, each substitution sensor outputting a signal value used for setting a substitutional value for a signal value output from the sensor whose abnormal state has been detected; and a predetermined operation control device (e.g., an ECU 22 in the embodiment) for operating the fuel cell in a predetermined operation state when the abnormal state of the sensor is detected by the abnormal state detecting device and it is determined by the substitution possibility determining device that there is no substitution sensor.

In the above structure, when an abnormal state is detected by the abnormal state detecting device, and it is determined by the substitution possibility determining device that there is no substitution sensor (that is, (i) when a target substitution sensor is in an abnormal state and thus the signal value output from the target substitution sensor cannot be used for computing the substitutional value, (ii) no signal value is output from a target substitution sensor, or (iii) no substitution sensor itself has been selected), the fuel cell is operated in the predetermined operation state regardless of the signal values output from the plurality of sensors, or of whether such signal values are present or obtained, thereby continuing the operation of the fuel cell. Therefore, it is possible to prevent a state such that supply of electric power from the fuel cell to a driving source of the fuel-cell movable body becomes difficult. Accordingly, it is possible to secure a required travel of the vehicle (e.g., a travel to a specific escape refuge or service area for the fuel cell vehicle in an abnormal state). Therefore, it is unnecessary to provide an excessive number of substitution sensors for each of the sensors of the system, thereby preventing (i) the fuel cell system from having a complicated structure, and (ii) the cost required for implementing the structure of the fuel cell system from increasing.

Typically, the predetermined operation state is a state by which the fuel cell itself does not enter an abnormal state (e.g., having damage in a solid polymer electrolyte membrane in the embodiment). In this case, a state by which the fuel cell itself does not enter an abnormal state (i.e., the fuel cell itself does not have damage) is predetermined in accordance with a result of an operation test or the like. Therefore, even when the fuel cell is operated in the predetermined operation state regardless of the signal values output from the plurality of sensors, or of whether such signal values are present or obtained, the fuel cell can be protected, and a normal operation of the fuel cell system can be easily restarted, for example, by exchanging only the sensor whose abnormal state has been detected for a new one.

In a preferable example, only quantities of operation state relating to the signal value output from the sensor whose abnormal state has been detected are set so as to provide the predetermined operation state.

The abnormal state detecting device may detect the abnormal state (i) when said at least one of said plurality of sensors outputs a signal value exceeding a predetermined upper or lower limit, (ii) when a predetermined state has been continued, in which a signal value output from said at least one of said plurality of sensors is fixed even when a signal value output from another sensor which associates with said at least one of said plurality of sensors varies, or (iii) when said at least one of said plurality of sensors outputs no signal value.

The present invention also provides a method of controlling a fuel cell, installed in a fuel-cell movable body, for generating electric power using reaction gases, the method comprising the steps of:

detecting an abnormal state of at least one of a plurality of sensors for measuring states of the fuel cell (refer to steps S01, S11, S18, and S23 in an embodiment explained later);

determining whether there are one or more substitution sensors from among said plurality of sensors, each substitution sensor outputting a signal value used for setting a substitutional value for a signal value output from the sensor whose abnormal state has been detected (refer to steps S03, S13, S20, and S25 in the embodiment); and operating the fuel cell in a predetermined operation state when the abnormal state of the sensor is detected and it is determined that there is no substitution sensor (refer to steps S05 to S08, S15 to S17, S22, S27 and S28 in the embodiment).

Typically, the predetermined operation state is a state by which the fuel cell itself does not enter an abnormal state (e.g., having damage).

Preferably, only quantities of operation state relating to the signal value output from the sensor whose abnormal state has been detected are set so as to provide the predetermined operation state.

The step of detecting an abnormal state may include detecting the abnormal state (i) when said at least one of said plurality of sensors outputs a signal value exceeding a predetermined upper or lower limit, (ii) when a predetermined state has been continued, in which a signal value output from said at least one of said plurality of sensors is fixed even when a signal value output from another sensor which associates with said at least one of said plurality of sensors varies, or (iii) when said at least one of said plurality of sensors outputs no signal value.

BRIEF DESCRIPTION OF THE DRAWINGS

FIG. 4 is a flowchart showing the operation of the fuel cell system as another variation of the embodiment.

DETAILED DESCRIPTION OF THE INVENTION

Hereinafter, a fuel cell system 10 as an embodiment in accordance with the present invention will be described with reference to the appended figures.

Figure 1:
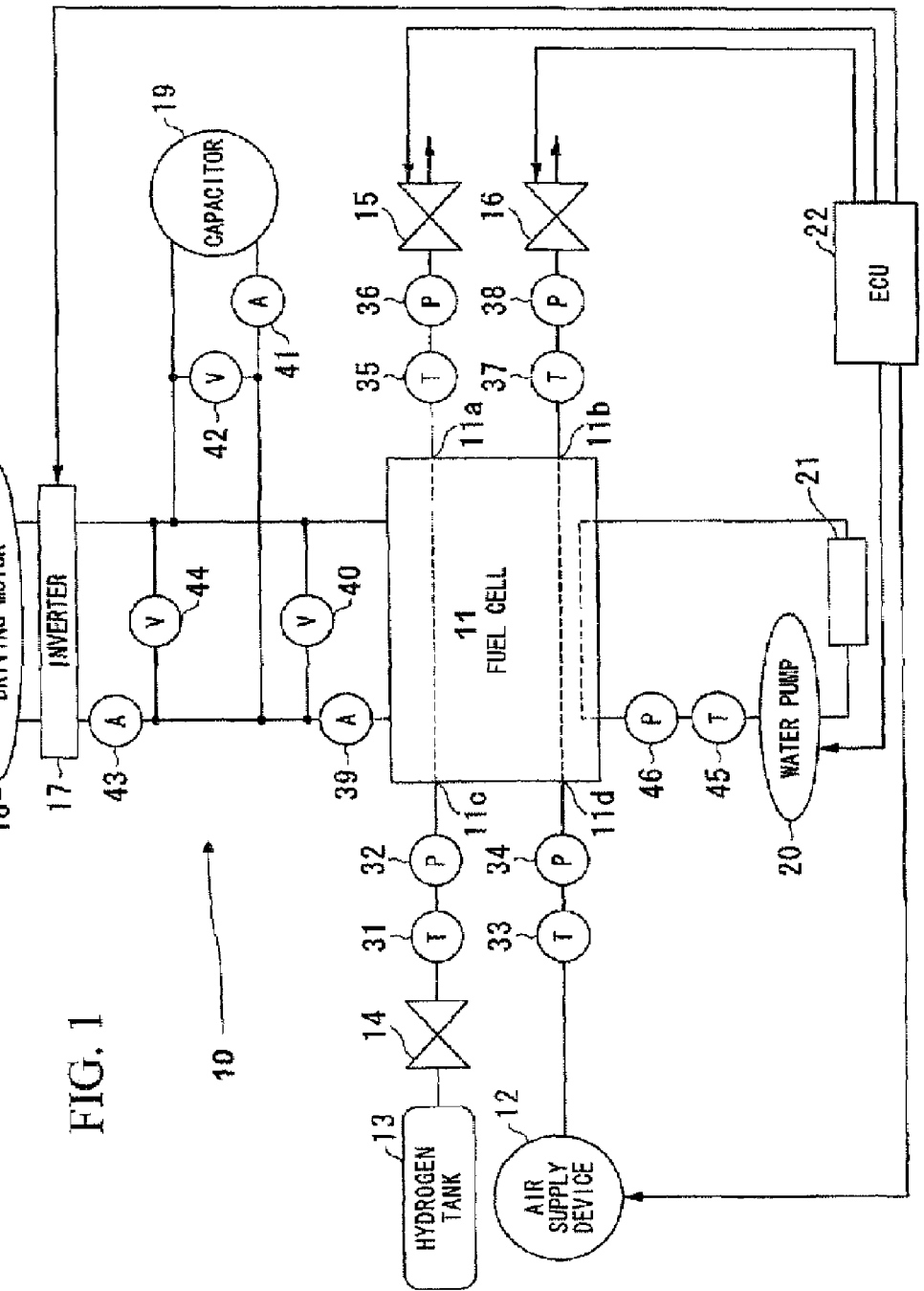
FIG. 1 is a diagram showing the structure of a fuel cell system as an embodiment in accordance with the present invention.

FIG. 1 is a diagram showing the structure of the fuel cell system 10 of the present embodiment. The fuel cell system 10 is installed, for example, in a fuel cell vehicle. As shown in FIG. 1, the fuel cell system 10 has a fuel cell 11, an air supply device 12, a hydrogen tank 13, a fuel supply control valve 14, a purge value 15, a back pressure valve 16, an inverter 17, a driving motor 18, a capacitor 19, a water pump 20, a radiator 21, and an ECU (electronic control unit) 22 as a central control unit.

The fuel cell 11 has a stacked body consisting of a number of stacked fuel cell units. Each fuel cell unit has an electrolyte electrode structure in which a solid polymer electrolyte membrane, which may be a cation exchange membrane, is provided and supported between a fuel electrode (i.e., an anode) and an air electrode (i.e., a cathode), where the fuel electrode has an anode catalyst and a gas diffusion layer, and the air electrode has a cathode catalyst and a gas diffusion layer. This electrolyte electrode structure is further supported by a pair of separators, that is, supported between the separators. A pair of end plates are provided on either side of the stacked body of the fuel cell units, with respect to the stacking direction.

Air as an oxidizing gas (i.e., a reaction gas) which includes oxygen is supplied by the air supply device 12 (having an air compressor or the like) to each cathode of the fuel cell 11, and a fuel gas (i.e., a reaction gas), which is hydrogen, is supplied to each anode of the fuel cell 11 from the high-pressure hydrogen tank 13 via the fuel supply control valve 14.

The hydrogen is ionized by catalytic reaction using the anode catalyst at the anode, and then passes the solid polymer electrolyte membrane which is appropriately humidified and reaches the cathode. This ion transfer results in generation of electrons, which are supplied into an external circuit and used as DC (direct current) electrical energy. In this process, hydrogen ions, electrons, and oxygen react with each other at the cathode, thereby generating water.

The fuel supply control valve 14 may be a pneumatic and proportional pressure control valve. The fuel supply control valve 14 is operated in a manner such that the hydrogen which has passed through the fuel supply control valve 14 has a pressure (which is measured at the outlet of the fuel supply control valve 14) in a specific range in accordance with a signal pressure, which is the pressure of air supplied by the air supply device 12.

The rotational frequency of a motor (not shown) for driving the air supply device 12 (which may have an air compressor) is controlled based on a control command input from the ECU 22.

A discharge gas, discharged from a hydrogen discharge outlet 11a of the fuel cell 11, is drawn into a dilution box (not shown) via a discharge control valve (not shown) whose OPEN/CLOSE states are controlled by the ECU 22, so that the concentration of the hydrogen is reduced below a specific value by using the dilution box. The discharge gas is then discharged outside (i.e., to the air or the like) via the purge valve 15.

Some of the unreacted discharge gas discharged from the hydrogen discharge outlet 11a of the fuel cell 11 is drawn into a circulation passage, which may have a circulation pump (not shown) and an ejector (not shown). The hydrogen supplied from the hydrogen tank 13 and the discharge gas discharged from the fuel cell 11 are mixed with each other, and the mixture is again supplied to the fuel cell 11.

An unreacted discharge gas discharged from an air discharge outlet 11b of the fuel cell 11 is discharged outside (i.e., to the air or the like) via the back pressure valve 16, where the degree of opening of the back pressure valve 16 is controlled by the ECU 22.

The generated current extracted from the fuel cell 11 may be input into a current controller (not shown) which may have a DC-DC converter or the like. Based on a current command value output from the ECU 22 (i.e., a power generation command for the fuel cell 11), the current controller controls the value of the generated current extracted from the fuel cell 11. The capacitor 19 and the inverter 17 are connected in series to the current controller. The capacitor 19 as a battery device may be an electric double layer capacitor or an electrolyte capacitor, and the inverter 17 controls the driving motor 18.

Cooling water for cooling the fuel cell 11 is boosted by the water pump 20 and supplied to cooling passages in the fuel cell 11. The supplied cooling water is subjected to heat exchange in the cooling passages, and then supplied to the radiator 21 so as to discharge heat. Accordingly, the cooling water is cooled, and returns to the water pump 20.

That is, the cooling water circulates in a cooling circuit, which is a closed circuit having the water pump 20, the fuel cell 11, and the radiator 21.

To the ECU 22 for controlling the operation states of the fuel cell 11, measurement signals output from the following sensors are input: (i) a hydrogen supply temperature sensor 31 and a hydrogen supply pressure sensor 32 for respectively measuring a temperature and a pressure of hydrogen supplied to a hydrogen supply inlet 11c of the fuel cell 11, (ii) an air supply temperature sensor 33 and an air supply pressure sensor 34 for respectively measuring a temperature and a pressure of air supplied to an air supply inlet 11d of the fuel cell 11, (iii) a hydrogen discharge temperature sensor 35 and a hydrogen discharge pressure sensor 36 for respectively measuring a temperature and a pressure of the discharge gas discharged from the hydrogen discharge outlet 11a of the fuel cell 11, (iv) an air discharge temperature sensor 37 and an air discharge pressure sensor 38 for respectively measuring a temperature and a pressure of the discharge gas discharged from the air discharge outlet 11b of the fuel cell 11, (v) a generated current sensor 39 and a generated voltage sensor 40 for respectively measuring the generated current and a terminal voltage of the fuel cell 11, (vi) a current sensor 41 and a voltage sensor 42 for respectively measuring a charge or discharge current and a terminal voltage of the capacitor 19, (vii) an input current sensor 43 and an input voltage sensor 44 for respectively measuring a current and a voltage input to the inverter 17, and (viii) a cooling water temperature sensor 45 and a cooling water pressure sensor 46 for respectively measuring a temperature and a pressure of the cooling water discharged from the water pump 20.

The fuel cell system 10 of the present embodiment has the above-described structure. Below, the operation of the fuel cell system 10, in particular, a control operation for controlling the operation state of the fuel cell 11, performed when at least one of the above-described sensors 31 to 46 enters an abnormal state, will be explained.

Figure 2:
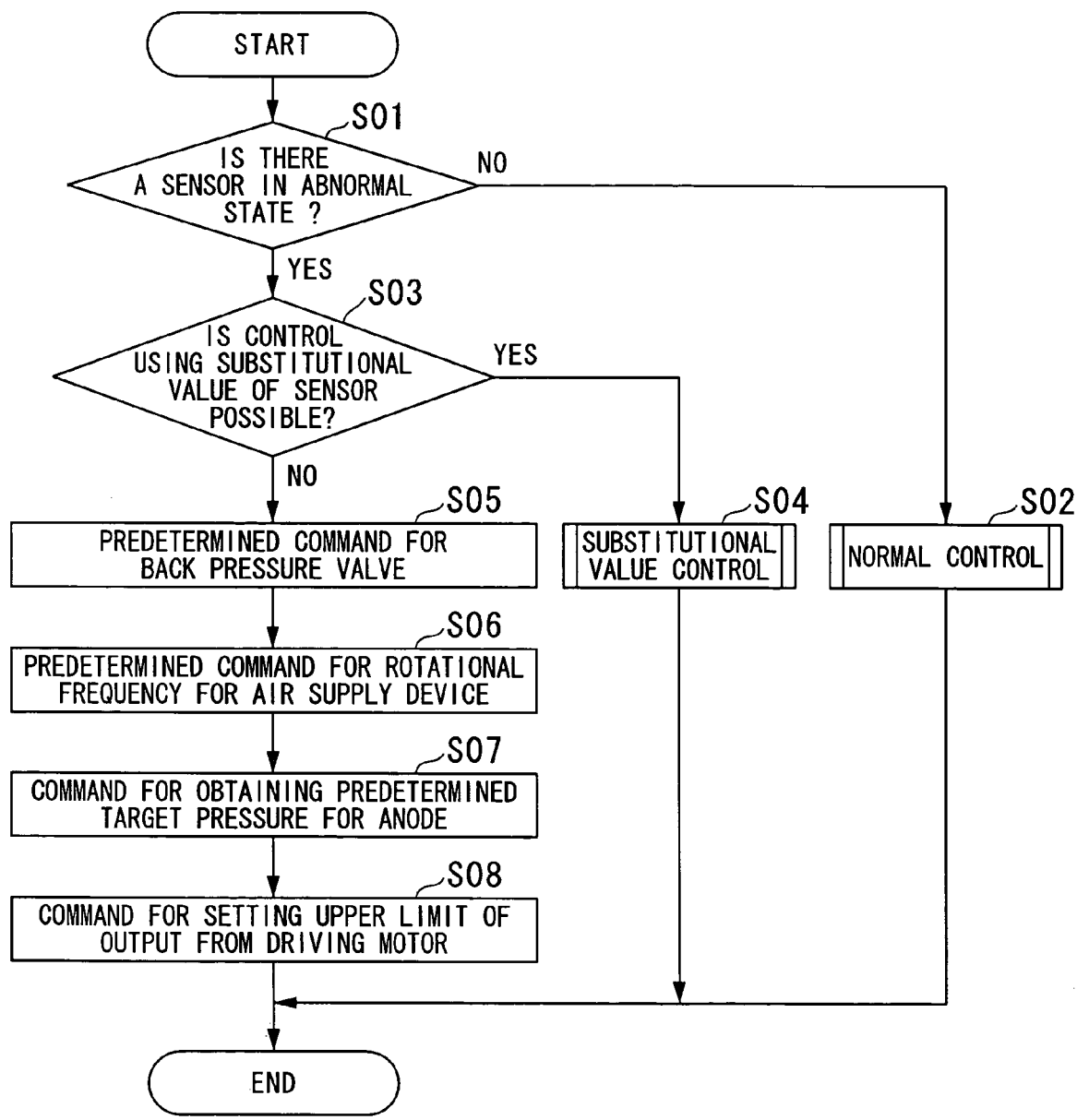
FIG. 2 is a flowchart showing the operation of the fuel cell system in the embodiment.

FIG. 2 is a flowchart showing the above control operation. In step S01 in FIG. 2, it is determined whether at least one of the above-described sensors 31 to 46 has entered an abnormal state. If the result of the determination is "YES", the operation proceeds to step S03 explained later. If the result of the determination is "NO", the operation proceeds to step S02.

Regarding the above determination about whether a sensor has entered an abnormal state, it may be determined (i) whether a signal value exceeding a predetermined upper or lower limit (assigned to a target sensor in a normal state) has been output, (ii) whether a state in which the signal value output from a target sensor is fixed even when the signal value output from a sensor which associates with the target sensor varies has been continued, or (iii) whether the signal value itself is output from a target sensor.

In step S02, normal control of controlling the operation of the fuel cell 11 in accordance with the signal values respectively output from the sensors 31 to 46 is performed.

In step S03, it is determined whether there are one or more substitution sensors, each outputting a signal value which can be used for computing (or setting) a substitutional value for the signal value output from the detected sensor in the abnormal state (i.e., the sensor whose abnormal state has been detected). If the result of the determination is "NO", the operation proceeds to step S05 explained later. If the result of the determination is "YES", the operation proceeds to step S04.

Regarding the above determination about whether there are one or more substitution sensors, it may be determined (i) whether the signal value output from a target substitution sensor cannot be used for computing the substitutional value due to an abnormal state of the substitution sensor, (ii) whether no signal value is output from a target substitution sensor, or (iii) whether no substitution sensor itself has been selected.

In step S04, a substitutional value for the signal value output from the detected sensor in the abnormal state is computed based on the signal value output from each substitution sensor, and substitutional value control of controlling the operation of the fuel cell 11 in accordance with the computed substitutional value and the signal values output from the sensors in the normal states is performed. The operation of the present flow is then terminated.

In step S05, a predetermined control command for controlling the degree of opening of the back pressure valve 16 is output from the ECU 22 so that the pressure of the discharge gas, discharged from the air discharge outlet 11b of the fuel cell 11, has a specific level by which the fuel cell 11 itself does not enter an abnormal state (e.g., having damage in the solid polymer electrolyte membrane due to a differential pressure between electrodes which exceeds a specific upper limit).

In step S06, a predetermined control command for controlling the rotational frequency of the motor (not shown) for driving the air supply device 12 is output from the ECU 22 so that the pressure of air, supplied to the air supply inlet 11d of the fuel cell 11, has a specific level by which the fuel cell 11 itself does not enter an abnormal state (e.g., having damage or the like).

In step S07, a predetermined control command for controlling the signal pressure input into the fuel supply control valve 14 (which may be the pressure of air supplied from the air supply device 12) is output from the ECU 22 so that the pressure of the hydrogen, supplied to the hydrogen supply inlet 11c of the fuel cell 11 (i.e., a target pressure for the anode), has a specific level by which the fuel cell 11 itself does not enter an abnormal state (e.g., having damage or the like).

In step S08, a predetermined control command for controlling the upper limit of the power output from the driving motor 18 is output from the ECU 22 so that the current generated by the fuel cell 11, which varies in accordance with the power output from the driving motor 18, has a level equal to or less than a specific upper limit, by which the fuel cell 11 itself does not enter an abnormal state (e.g., having damage or the like).

The operation of the present flow is then terminated.

As described above, in accordance with the fuel cell system 10 of the present embodiment, when it is determined that at least one of the plurality of sensors 31 to 46 has an abnormal state and there is no substitutional sensor for the sensor whose abnormal state has been detected, the fuel cell 11 is operated in a predetermined operation state which is set in advance, regardless of signal values output from other sensors in normal states. Therefore, desired operation of the fuel cell 11 can be continued.

Accordingly, it is possible to prevent a state such that supply of electric power from the fuel cell 11 to the driving motor 18 (i.e., a driving source of the present fuel cell vehicle) becomes difficult. Therefore, it is possible to secure a required travel of the vehicle (e.g., a travel to a specific escape refuge or service area for the fuel cell vehicle in an abnormal state). In addition, it is unnecessary to provide an excessive number of substitution sensors (i.e., redundant sensors) for each of the sensors 31 to 46, thereby preventing (i) the fuel cell system 10 from having a complicated structure, and (ii) the cost required for implementing the structure of the fuel cell system 10 from increasing.

In addition, even when the fuel cell 11 is operated in a predetermined operation state regardless of the signal values output from the plurality of sensors 31 to 46, or of whether such signal values are present or obtained, the fuel cell 11 can be protected, and a normal operation of the fuel cell system 10 can be easily restarted, for example, by exchanging only the sensor whose abnormal state has been detected for a new one.

In the above-described embodiment, when an abnormal state of at least one of the sensors 31 to 46 is detected, the operation state of the entire fuel cell system 10 is set to a predetermined operation state. However, this is not a limited condition. For example, only one or more quantities of operation state relating to the signal value output from the sensor whose abnormal state has been detected may be set to have a predetermined operation state (see a variation shown in FIGS. 3 and 4).

Figure 3:
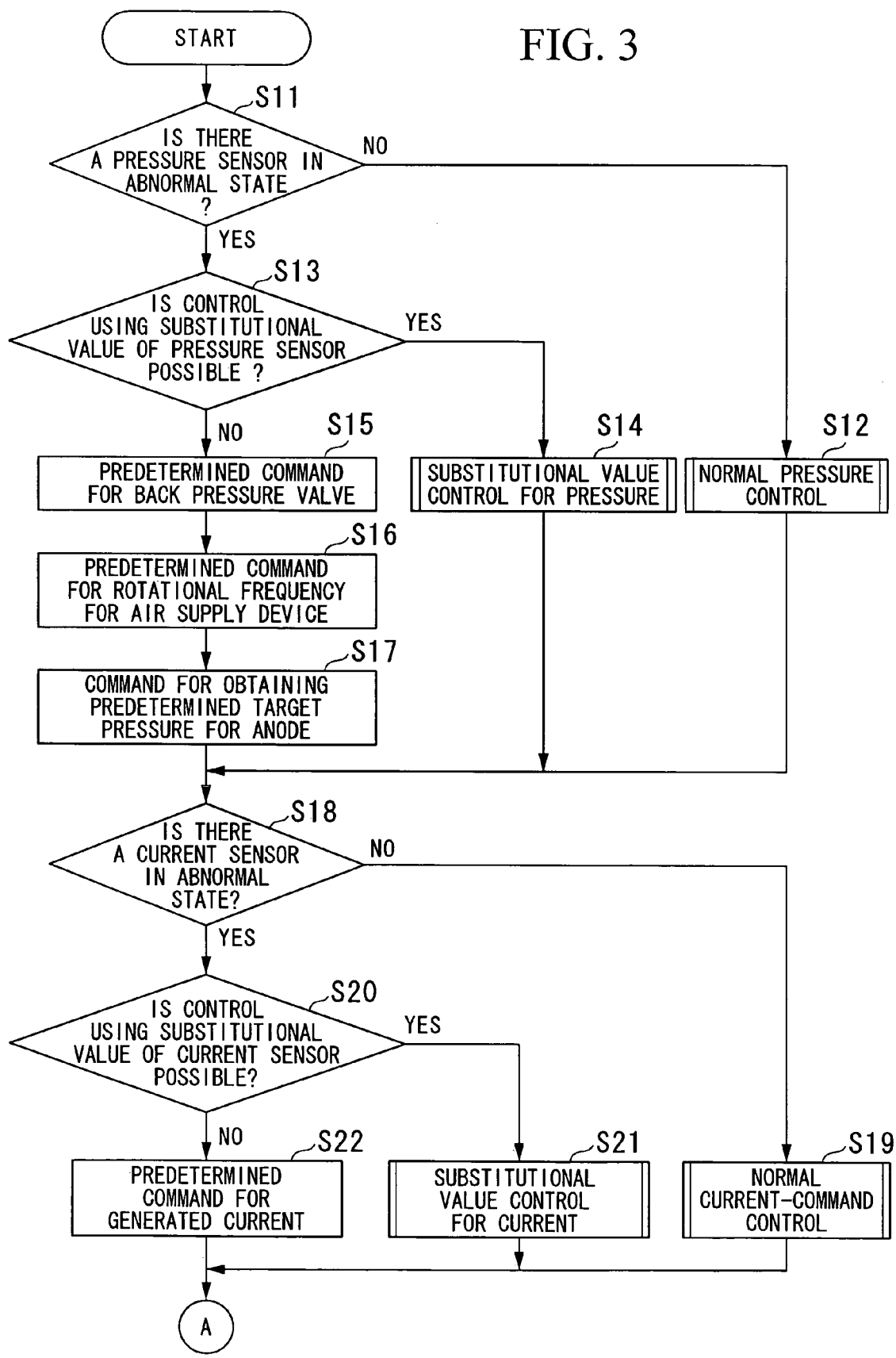
FIG. 3 is a flowchart showing the operation of the fuel cell system as a variation of the embodiment.

In the shown variation, in the first step S11 in FIG. 3, it is determined whether at least one of the pressure sensors 32, 34, 36, and 38 has entered an abnormal state.

If the result of the determination is "YES", the operation proceeds to step S13 (explained later). If the result of the determination is "NO", the operation proceeds to step S12.

In step S12, normal pressure control is performed, in which quantities of state relating to the reaction gases of the fuel cell 11 are controlled in accordance with the signal values output from the pressure sensors 32, 34, 36, and 38. The operation of the present flow is then terminated.

In step S13, it is determined whether there are one or more substitution sensors, each outputting a signal value which can be used for computing (or setting) a substitutional value for the signal value output from the detected pressure sensor in the abnormal state (i.e., the sensor whose abnormal state has been detected). If the result of the determination is "NO", the operation proceeds to step S15 explained later. If the result of the determination is "YES", the operation proceeds to step S14.

In step S14, a substitutional value for the signal value output from the detected pressure sensor in the abnormal state is computed based on the signal value output from each substitution sensor, and substitutional value control for pressure is performed, in which the quantities of state relating to the reaction gases of the fuel cell 11 are controlled in accordance with the computed substitutional value and the signal values output from pressure sensors in normal states. The operation of the present flow is then terminated.

In step S15, a predetermined control command for controlling the degree of opening of the back pressure valve 16 is output from the ECU 22 so that the pressure of the discharge gas, discharged from the air discharge outlet 11b of the fuel cell 11, has a specific level by which the fuel cell 11 itself does not enter an abnormal state (e.g., having damage in the solid polymer electrolyte membrane due to a differential pressure between electrodes which exceeds a specific upper limit).

In step S16, a predetermined control command for controlling the rotational frequency of the motor (not shown) for driving the air supply device 12 is output from the ECU 22 so that the pressure of air, supplied to the air supply inlet 11d of the fuel cell 11, has a specific level by which the fuel cell 11 itself does not enter an abnormal state (e.g., having damage or the like).

In step S17, a predetermined control command for controlling the signal pressure input into the fuel supply control valve 14 (which may be the pressure of air supplied from the air supply device 12) is output from the ECU 22 so that the pressure of the hydrogen, supplied to the hydrogen supply inlet 11c of the fuel cell 11 (i.e., a target pressure for the anode), has a specific level by which the fuel cell 11 itself does not enter an abnormal state (e.g., having damage or the like).

In step S18, it is determined whether at least one of the current sensors 39, 41, and 43 is in an abnormal state.

If the result of the determination is "YES", the operation proceeds to step S20 (explained later). If the result of the determination is "NO", the operation proceeds to step S19.

In step S19, normal current-command control is performed, in which quantities of state relating to the current generated by the fuel cell 11 are controlled in accordance with the signal values output from the current sensors 39, 41, and 43. The operation of the present flow is then terminated.

In step S20, it is determined whether there are one or more substitution sensors, each outputting a signal value which can be used for computing (or setting) a substitutional value for the signal value output from the detected current sensor in the abnormal state. For example, in the present case of having three current sensors 39, 41, and 43, when any two of the three sensors are in normal states, a substitutional value for the signal value output from the detected current sensor in the abnormal state can be easily computed.

If the result of the determination is "NO", the operation proceeds to step S22 explained later. If the result of the determination is "YES", the operation proceeds to step S21.

In step S21, a substitutional value for the signal value output from the detected current sensor in the abnormal state is computed based on the signal value output from each substitution sensor, and substitutional value control for current is performed, in which the quantities of state relating to the current generated by the fuel cell 11 are controlled in accordance with the computed substitutional value and the signal values output from the current sensors in the normal states. The operation of the present flow is then terminated.

In step S22, a predetermined control command for controlling the current generated by the fuel cell 11 is output from the ECU 22 so as to provide an operation state by which the fuel cell 11 itself does not enter an abnormal state (e.g., having damage in the solid polymer electrolyte membrane due to a differential pressure between electrodes which exceeds a specific upper limit).

In step S23, it is determined whether at least one of cell voltage sensors (not shown) is in an abnormal state. The cell voltage sensors respectively measure cell voltages, which are voltages respectively output from the fuel cell units which form the fuel cell 11.

If the result of the determination is "YES", the operation proceeds to step S25 (explained later). If the result of the determination is "NO", the operation proceeds to step S24.

In step S24, normal cell-voltage control is performed, in which quantities of state relating to the upper limit of the current generated by the fuel cell 11 are controlled in accordance with the signal values output from the cell voltage sensors. The operation of the present flow is then terminated.

In step S25, it is determined whether there are one or more substitution sensors, each outputting a signal value which can be used for computing (or setting) a substitutional value for the signal value output from the detected cell voltage sensor in the abnormal state. If the result of the determination is "NO", the operation proceeds to step S27 explained later. If the result of the determination is "YES", the operation proceeds to step S26.

In step S26, a substitutional value for the signal value output from the detected cell voltage sensor in the abnormal state is computed based on the signal value output from each substitution sensor, and substitutional value control for current is performed, in which the quantities of state relating to the upper limit of the current generated by the fuel cell 11 are controlled in accordance with the computed substitutional value and the signal values output from the cell voltage sensors in the normal states. The operation of the present flow is then terminated.

In step S27, a predetermined control command for controlling the upper limit of the current generated by the fuel cell 11 is output from the ECU 22 so as to provide an operation state by which the fuel cell 11 itself does not enter an abnormal state (e.g., having damage in the solid polymer electrolyte membrane due to a differential pressure between electrodes which exceeds a specific upper limit).

In step S28, an upper limit of the power output from the driving motor 18 is set in accordance with the processes of the above-described steps S11 to S27, and the operation of the present flow is terminated.

In this variation, only the quantities of operation state relating to the signal value output from the sensor, whose abnormal state has been detected, are set so as to provide a predetermined operation state. Therefore, it is possible to improve flexibility in setting the predetermined operation state of the fuel cell 11 in comparison with the case of setting the operation state of the entire fuel cell system 10 to a predetermined operation state when at least one of the sensors 31 to 46 enters an abnormal state.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of controlling a fuel cell, installed in a fuel-cell movable body, for generating electric power using reaction gases, the method comprising the steps of:

detecting an abnormal state of at least a first sensor from among a plurality of sensors for measuring operational values of the fuel cell, wherein the first sensor provides a first signal value and a second sensor provides a second signal value associated with the first signal value, and the abnormal state of at least the first sensor is detected when a signal value output from the first sensor is fixed even when a signal value output from the second sensor varies;

determining whether there are one or more substitution sensors from among said plurality of sensors, each substitution sensor outputting a signal value used for setting a substitutional value for a signal value output from the first sensor whose abnormal state has been detected, wherein the step of determining whether there are one or more substitution sensors from among said plurality of sensors comprises one of determining whether a target substitution sensor is in an abnormal state, determining whether the target substitution sensor is not outputting a signal, or determining whether no substitution sensor has been predefined; and operating the fuel cell using predetermined operational values when the abnormal state of the sensor is detected and it is determined that there is no substitution sensor, wherein the predetermined operational values are provided by setting operational values relating only to the first sensor whose abnormal state has been detected.

2. The method in accordance with claim 1, wherein operating the fuel cell using predetermined operational values operates the fuel cell in a state by which the fuel cell itself does not enter an abnormal state.

3. The method in accordance with claim 1, wherein the step of detecting an abnormal state includes detecting the abnormal state when said at least one of said plurality of sensors outputs a signal value greater than a predetermined upper limit, or lower than a predetermined lower limit.

4. The method in accordance with claim 1, wherein the step of detecting an abnormal state includes detecting the abnormal state when said at least one of said plurality of sensors outputs no signal value.

5. The method in accordance with claim 2, wherein operating the fuel cell using predetermined operational values operates the fuel cell in a state by which the fuel cell itself does not have damage.

* * * * *